(12) United States Patent
Chiang

(10) Patent No.: US 8,844,964 B2
(45) Date of Patent: Sep. 30, 2014

(54) CONVERTIBLE TANDEM STROLLER WITH A DOUBLE SEAT TRANSFER MECHANISM

(71) Applicant: Lerado (Zhong Shan) Industrial Co., Ltd., Zhong Shan (CN)

(72) Inventor: Sen-Yung Chiang, Dounan Township, Yunlin County (TW)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 0 days.

(21) Appl. No.: 13/863,042

(22) Filed: Apr. 15, 2013

(65) Prior Publication Data
US 2013/0270800 A1 Oct. 17, 2013

(30) Foreign Application Priority Data

Apr. 16, 2012 (CN) .......................... 2012 1 0111520
Apr. 16, 2012 (CN) ....................... 2012 2 0160950 U

(51) Int. Cl.
*B62B 1/00* (2006.01)
*B62B 3/00* (2006.01)
*B62B 7/14* (2006.01)

(52) U.S. Cl.
CPC ...................................... *B62B 7/14* (2013.01)
USPC ............ 280/658; 280/642; 280/650; 280/647

(58) Field of Classification Search
CPC ................................... B62B 7/08; B62B 7/04
USPC ........ 280/650, 649, 657, 642, 658, 31, 47.39, 280/47.38, 647
See application file for complete search history.

(56) References Cited

U.S. PATENT DOCUMENTS

| | | | | |
|---|---|---|---|---|
| 522,608 | A * | 7/1894 | Macklin | 297/242 |
| 677,195 | A * | 6/1901 | Frederick | 297/240 |
| 720,692 | A * | 2/1903 | Hawkins | 297/240 |
| 3,997,180 | A * | 12/1976 | Okubo | 280/31 |
| 4,620,686 | A * | 11/1986 | Conant | 248/418 |
| 7,364,183 | B2 * | 4/2008 | Lee | 280/642 |
| 7,475,900 | B2 * | 1/2009 | Cheng | 280/642 |
| D598,333 | S * | 8/2009 | Li et al. | D12/129 |
| 8,157,273 | B2 * | 4/2012 | Bar-Lev | 280/47.39 |
| 8,398,143 | B1 * | 3/2013 | Haley | 297/344.21 |
| 8,444,171 | B2 * | 5/2013 | Smith et al. | 280/649 |
| 8,596,670 | B2 * | 12/2013 | di Carimate et al. | 280/650 |

* cited by examiner

*Primary Examiner* — Hau Phan
(74) *Attorney, Agent, or Firm* — Muncy, Geissler, Olds & Lowe, P.C.

(57) ABSTRACT

A convertible tandem stroller with a double seat transfer mechanism includes a wheeled rack, a pair of extension arms and a pair of chairs. The stroller is featured with the wheeled rack having a swivel mount, the pair of extension arms being connected to the swivel mount, and the pair of chairs being swively mounted on the pair of extension arms. The extension arms are capable of swiveling relative to the wheeled rack and positioning on a longitudinally oriented position and a transversely oriented position so as to convert the stroller from a tandem style to a side-by-side double seat style, and vice versa.

12 Claims, 17 Drawing Sheets ly oriented

CONVERTIBLE TANDEM STROLLER WITH A DOUBLE SEAT TRANSFER MECHANISM

BACKGROUND OF THE INVENTION

1. Field of the Invention

The present invention relates to a tandem stroller capable of converting either a tandem style and a side-by-side double seat style, especially to a tandem stroller has a pair of extension arms for carrying two seats in a longitudinally oriented position and a transversely oriented position, so as to convert the tandem stroller from a tandem style to a side-by-side double seat style.

2. Description of the Related Art

There are two kinds of commercial available double seat stroller, one is so called tandem stroller, and another one is called side-by-side double seat stroller.

The tandem stroller is much easier to steer along a narrower passage and would be easier to pass a normal family doors and some small elevator gates due to having a narrower width; however, as the seats are arranged one after another, the occupant of the rear seat has always a limited view while being traveling around together with another baby or small children.

Although the occupants of the side-by-side double seat stroller may have much equal and good view when being traveling on road, it is difficult to steer along a narrower passage and would not easy to pass a normal width family door as well as to pass a smaller elevator gate due to having double width than a normal one seat stroller.

It is desired to have a convertible double seat stroller for sometime to be use as a tandem stroller, and another time to be use as a side-by-side double seat stroller, totally under the decision of a user.

SUMMARY OF THE INVENTION

In order to fulfill the above mentioned long need for converting a double seats stroller between a tandem style and a side-by-side double seat style, the present invention provides a convertible tandem stroller with a double seat transfer mechanism, including a wheeled rack, a pair of extension arms and a pair of chairs.

The convertible tandem stroller of the present invention is featured with the wheeled rack having a swivel mount, the pair of extension arms being connected to the swivel mount, and the pair of chairs being swively mounted on the pair of extension arms. The extension arms are capable of swiveling relative to the wheeled rack and positioning on a longitudinally oriented position and a transversely oriented position so as to convert the stroller from a tandem style to a side-by-side double seat style, and vice versa.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention; examples of which are illustrated in the accompanying drawings.

Figure 7:
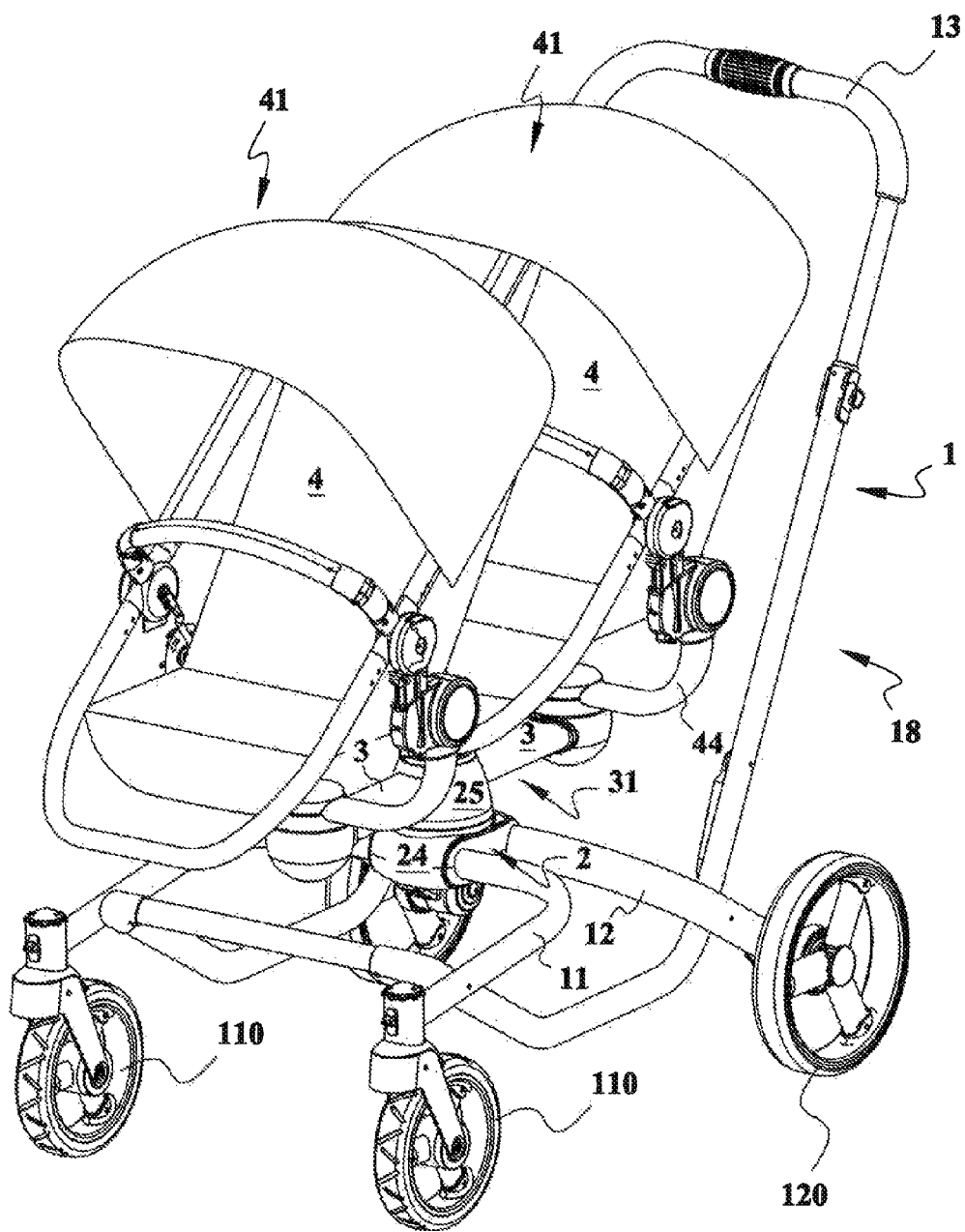
FIG. 7 is a front-left schematic perspective view showing the convertible tandem stroller has been converted to a tandem style.
Figure 9:
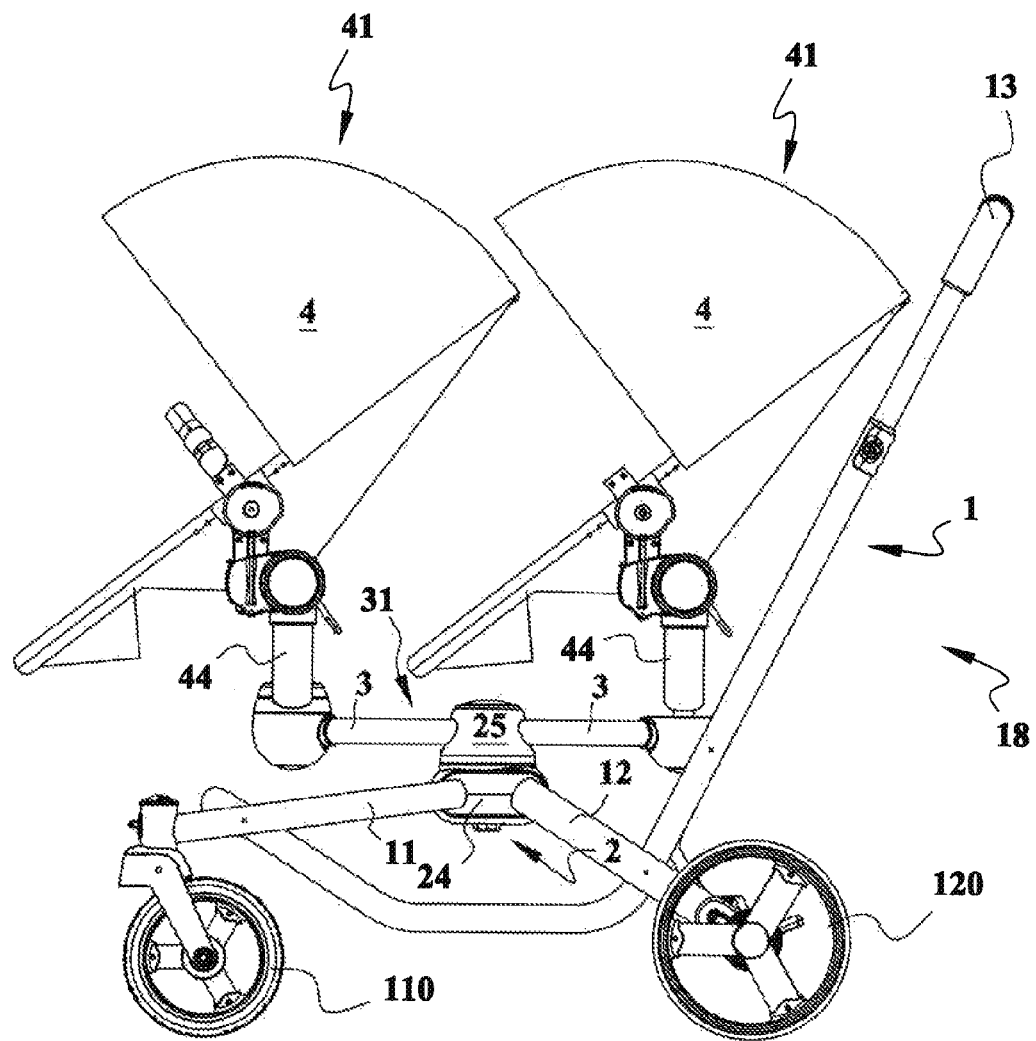
FIG. 9 is a schematic side view showing the convertible tandem stroller has been converted to a tandem style.
Figure 10:
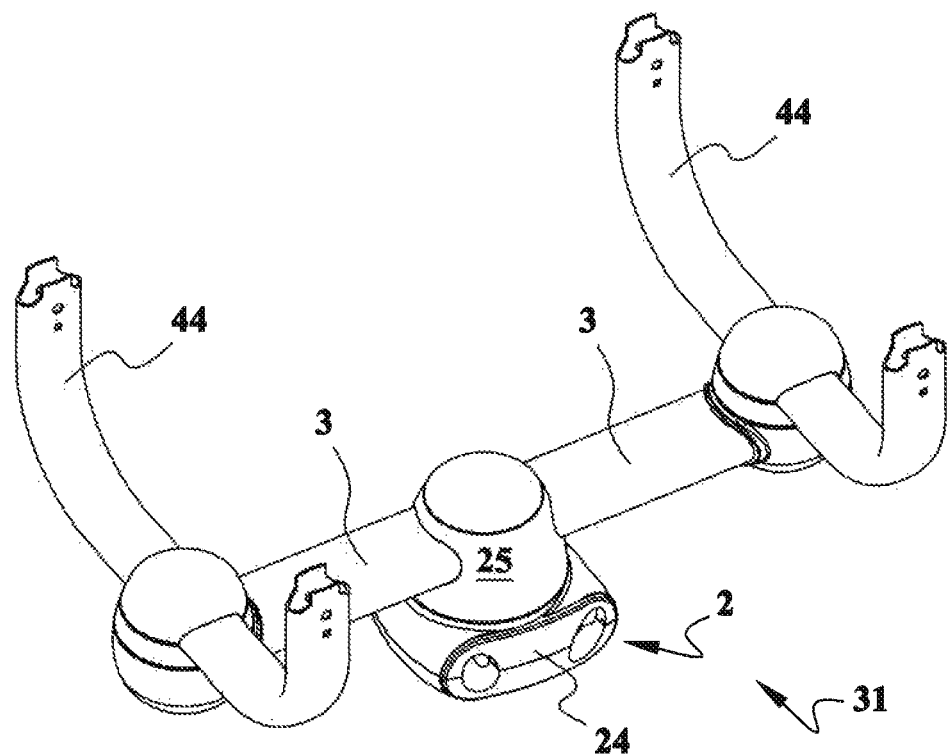
FIG. 10 is a schematic perspective view showing the association between the body frames of the chairs and the extension anus, when the convertible tandem stroller is positioning in a tandem style.
Figure 11:
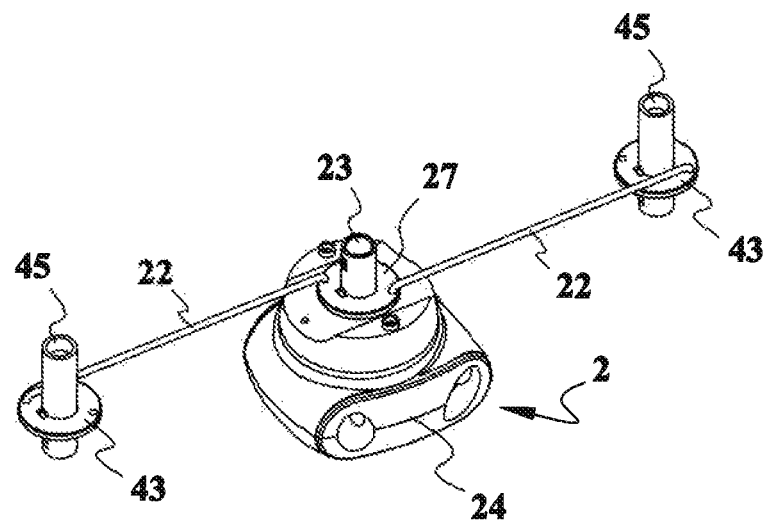
FIG. 11 is a schematic perspective view showing the association between the vertical shaft of the chairs, the driven element, the linking elements and the driving element, when the convertible tandem stroller is positioning in a tandem style.
Figure 12:
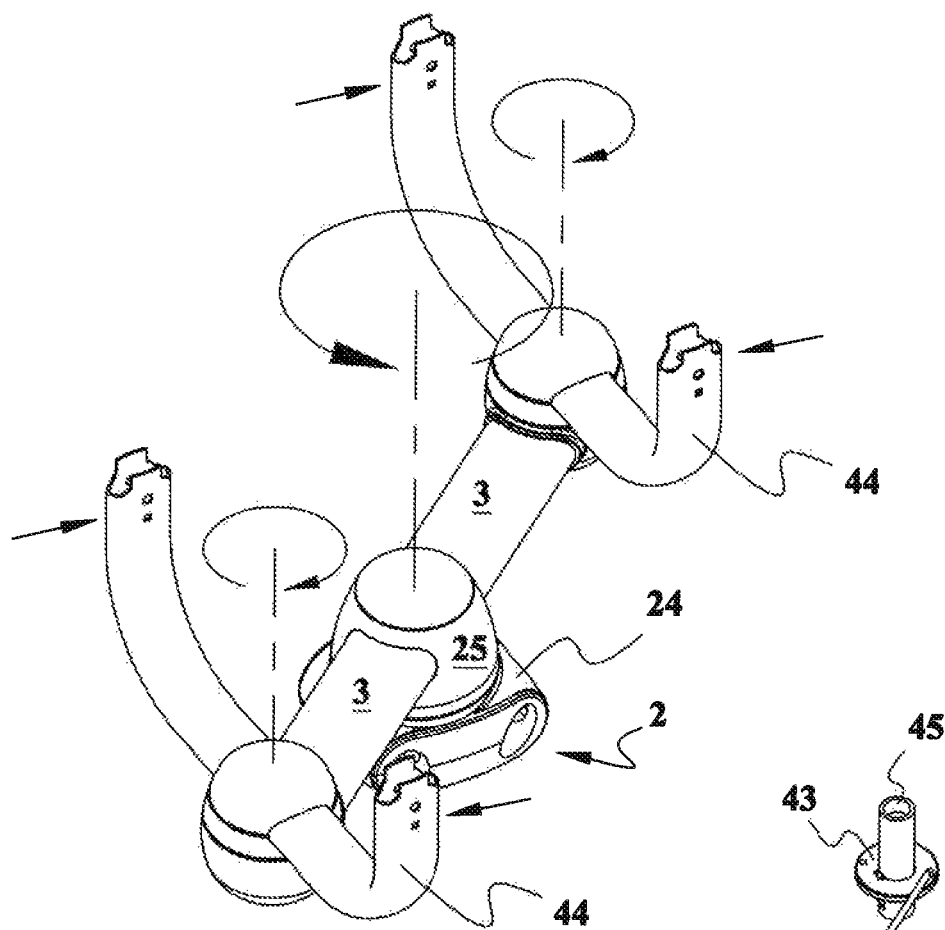
FIG. 12 is a schematic perspective view showing the association between the body frames of the chairs and the extension arms, when the convertible tandem stroller is converting from a tandem style to a side-by-side double seat style.
Figure 13:
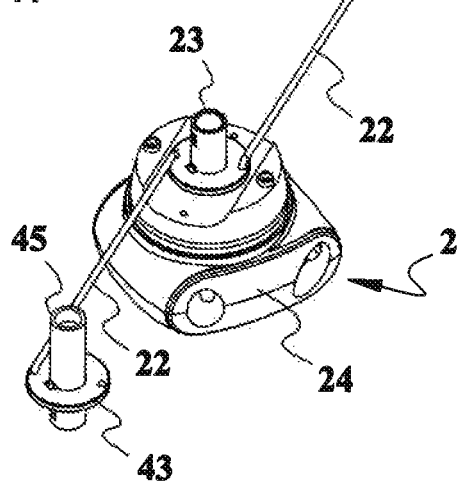
FIG. 13 is a schematic perspective view showing the association between the vertical shaft of the chairs, the driven element, the linking elements and the driving element, when the convertible tandem stroller is converting from a tandem style to a side-by-side double seat style.
Figure 14:
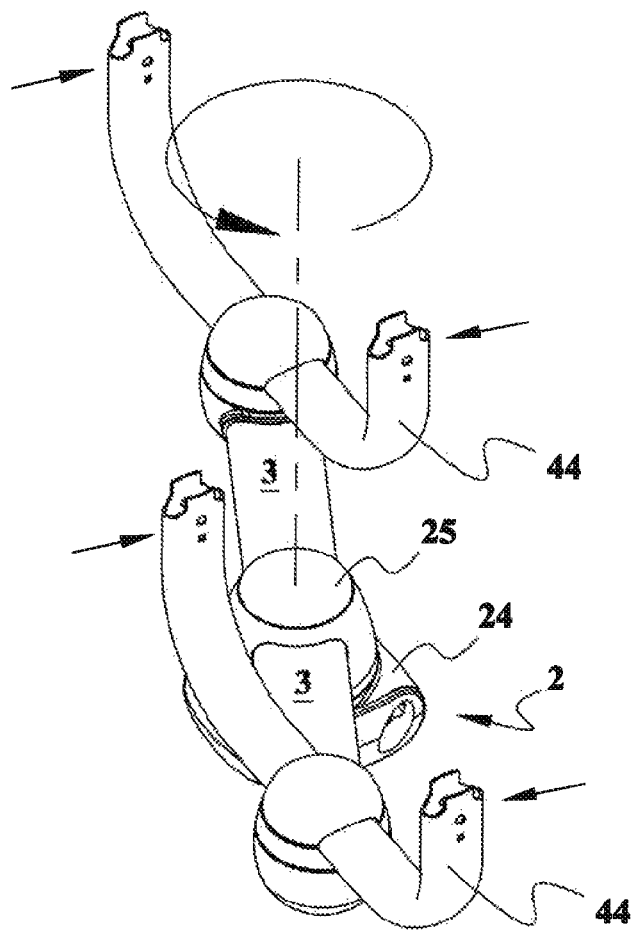
FIG. 14 is a schematic perspective view showing the association between the body frames of the chairs and the extension arms, when the convertible tandem stroller is converting from a tandem style to nearly a side-by-side double seat style.
Figure 15:
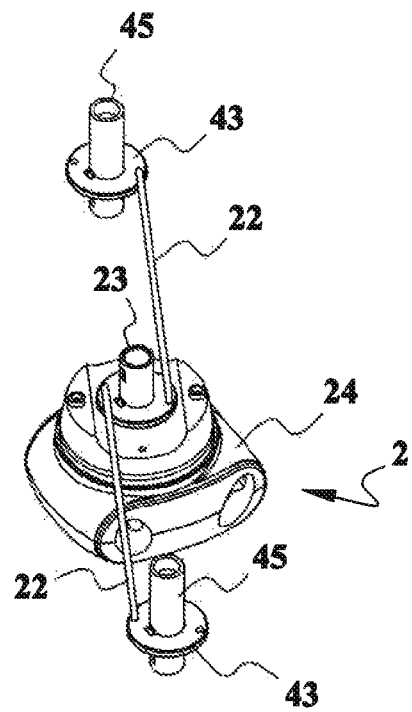
FIG. 15 is a schematic perspective view showing the association between the vertical shaft of the chairs, the driven element, the linking elements and the driving element, when the convertible tandem stroller is converting from a tandem style to nearly a side-by-side double seat style.
Figures 16, 17:
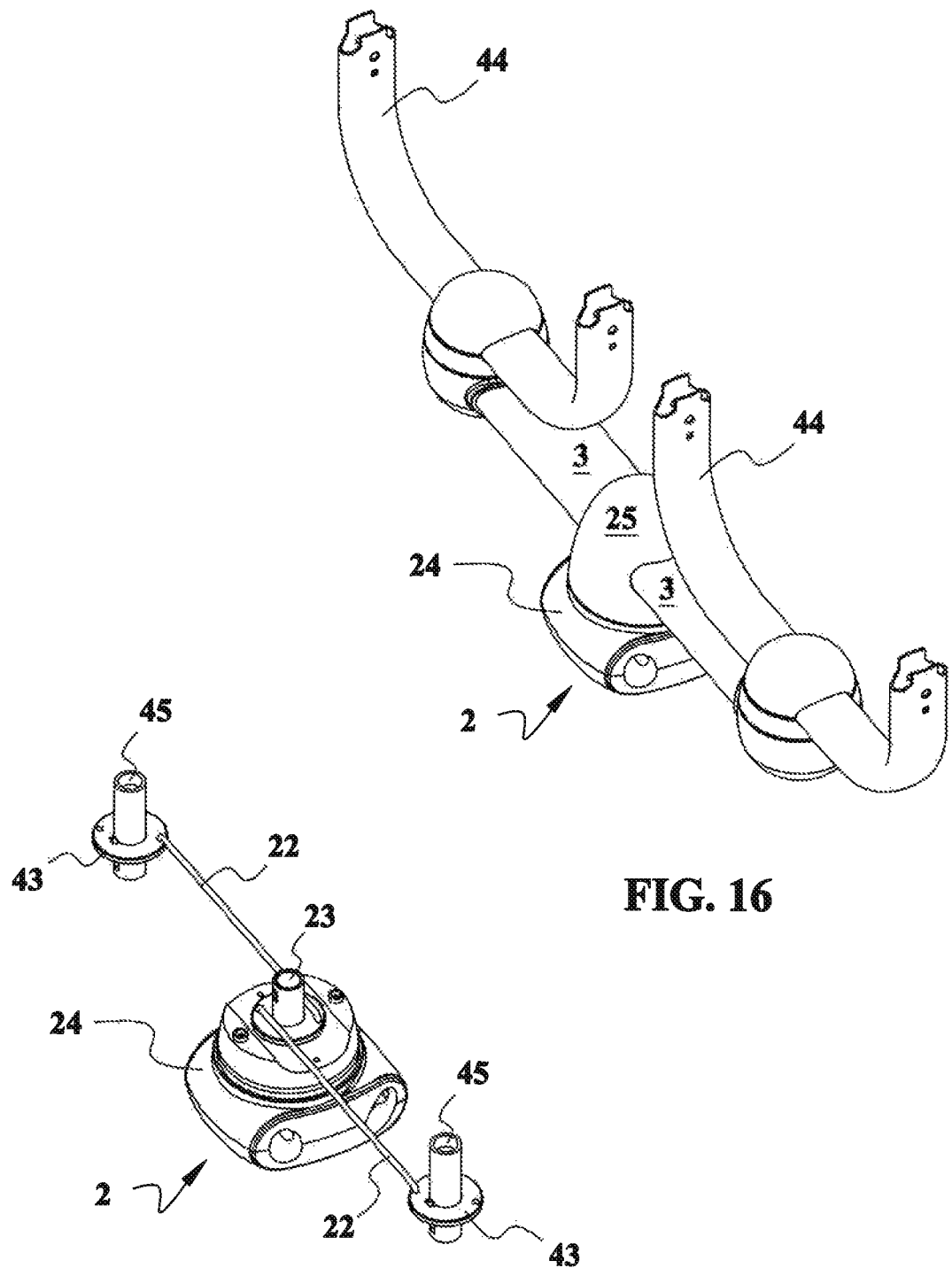
FIG. 16 is a schematic perspective view showing the association between the body frames of the chairs and the extension arms, when the convertible tandem stroller is converted to a side-by-side double seat style.
FIG. 17 is a schematic perspective view showing the association between the vertical shaft of the chairs, the driven element, the linking elements and the driving element, when the convertible tandem stroller is converted to a side-by-side double seat style.
Figure 18:
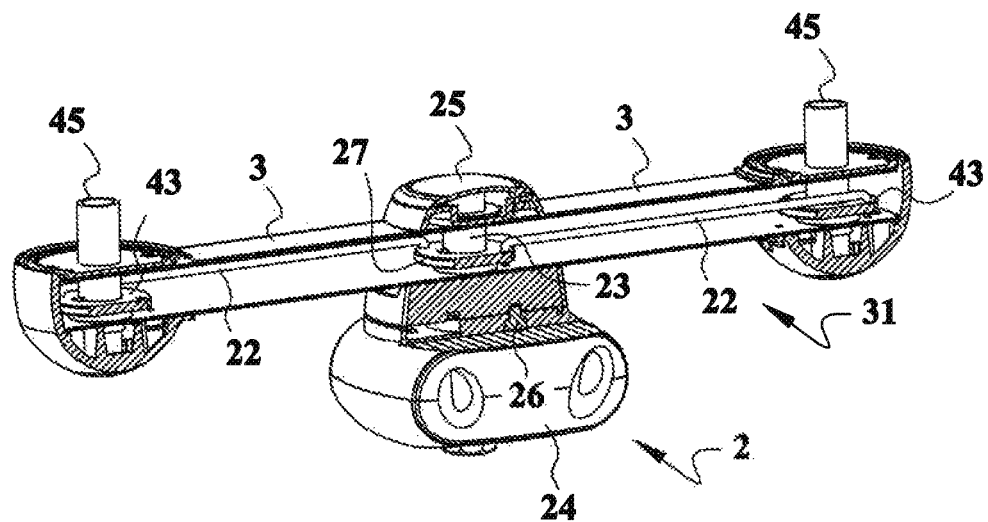
FIG. 18 is a schematic perspective view showing the association between the vertical shaft of the chairs, the driven element, the linking elements and the driving element, when the extension arms have been locked in a longitudinally oriented position.
Figure 19:
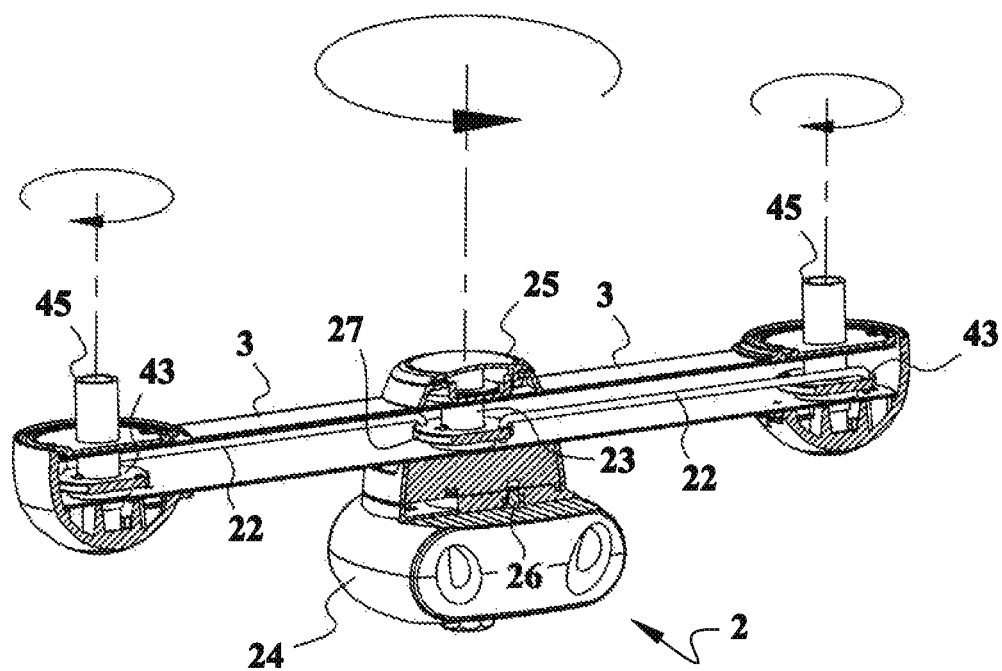
FIG. 19 is a schematic perspective view showing the association between the vertical shaft of the chairs, the driven element, the linking elements and the driving element, when the extension arms have been un-locked from the longitudinally oriented position.
Figure 20:
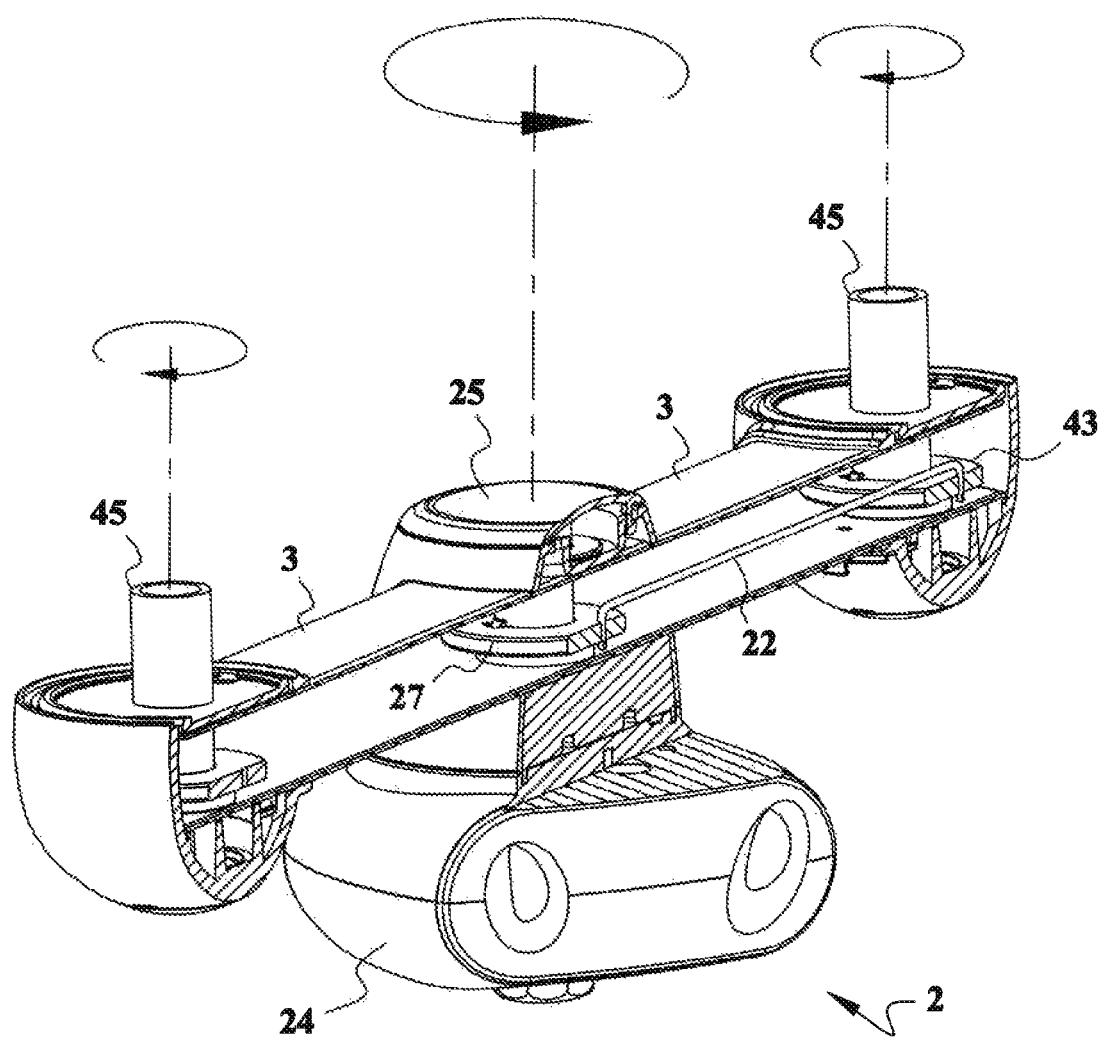
FIG. 20 is a schematic perspective view showing the association between the vertical shaft of the chairs, the driven element, the linking elements and the driving element, when the extension arms are un-locked and swiveling away from the longitudinally oriented position.

Referring to FIGS. 7 and 9, an embodiment of the convertible tandem stroller with a double seat transfer mechanism according to the present invention includes a wheeled rack 1, a pair of extension arms 3 and a pair of chairs 4.

The wheeled rack 1 may be equipped a push arm 13 extending rearward and upwardly for use to push the convertible tandem stroller forward. The wheeled rack 1 of the present embodiment includes at least a front strut 11 and a pair of rear struts 12. The front strut 11 and rear struts 12 are firmly connected by a swivel mount 2 and being connected with at least a front wheel 110 and two a rear wheel 120 at the lower ends of wheeled rack 1.

Figure 1:
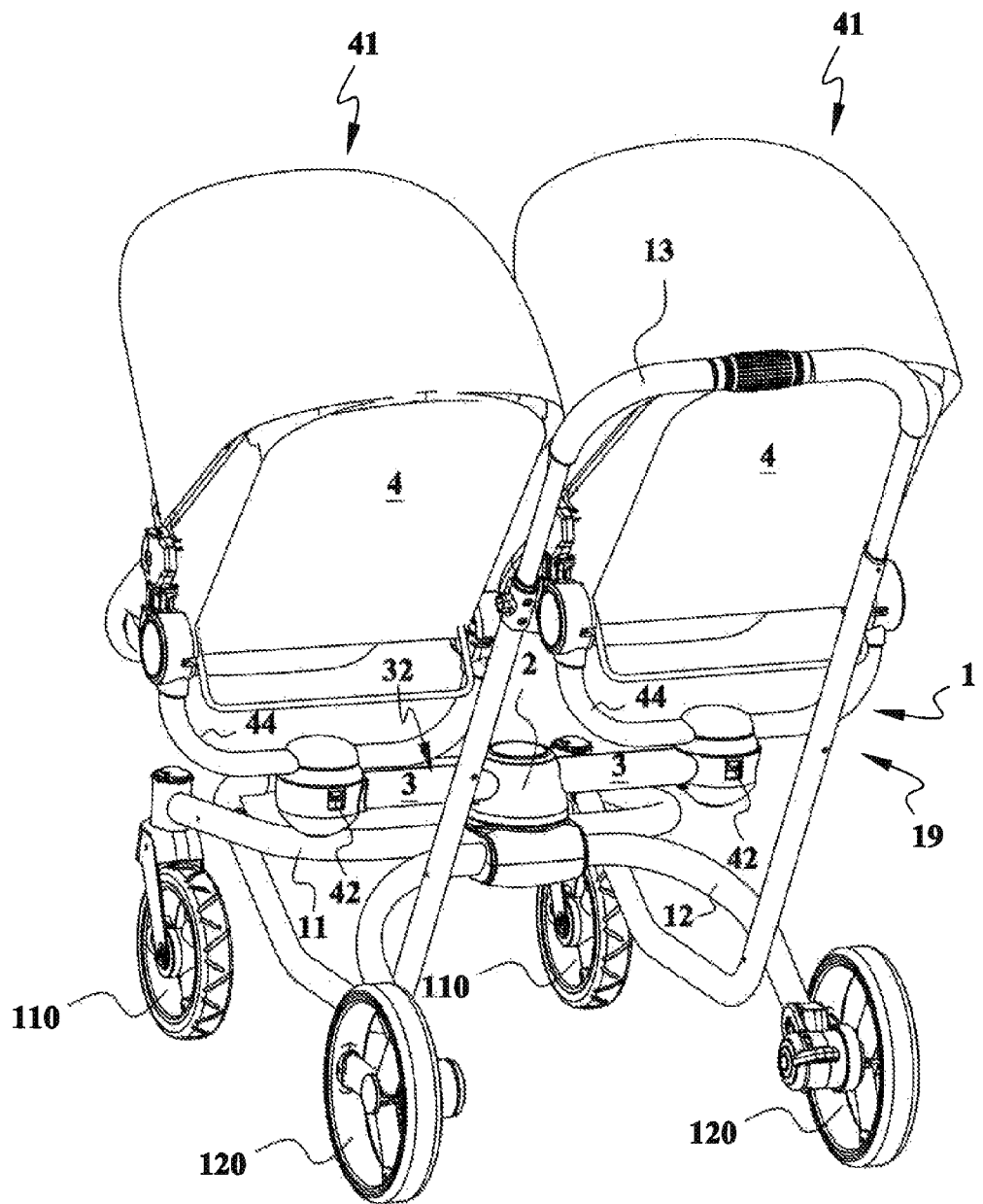
FIG. 1 is a rear-left perspective view showing an embodiment of the convertible tandem stroller according to the present invention has been converted to a side-by-side double seat style 19, in this embodiment both of the chairs are lockable to the extension arms.
Figure 2:
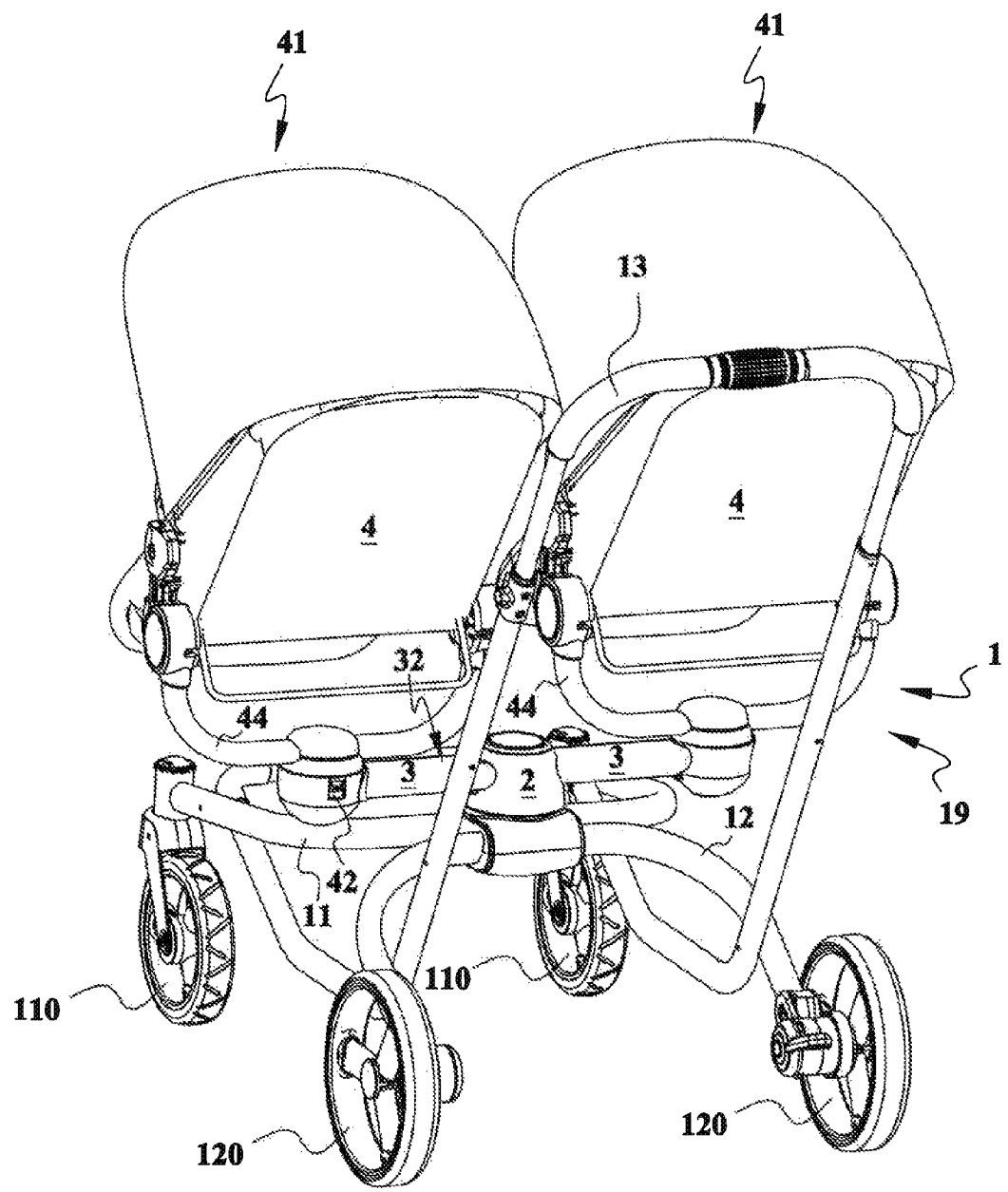
FIG. 2 is a rear-left perspective view showing an embodiment of the convertible tandem stroller according to the present invention has been converted to side-by-side double seat style 19, in this embodiment one of the chairs are lockable to one of the extension arms.
Figure 3:
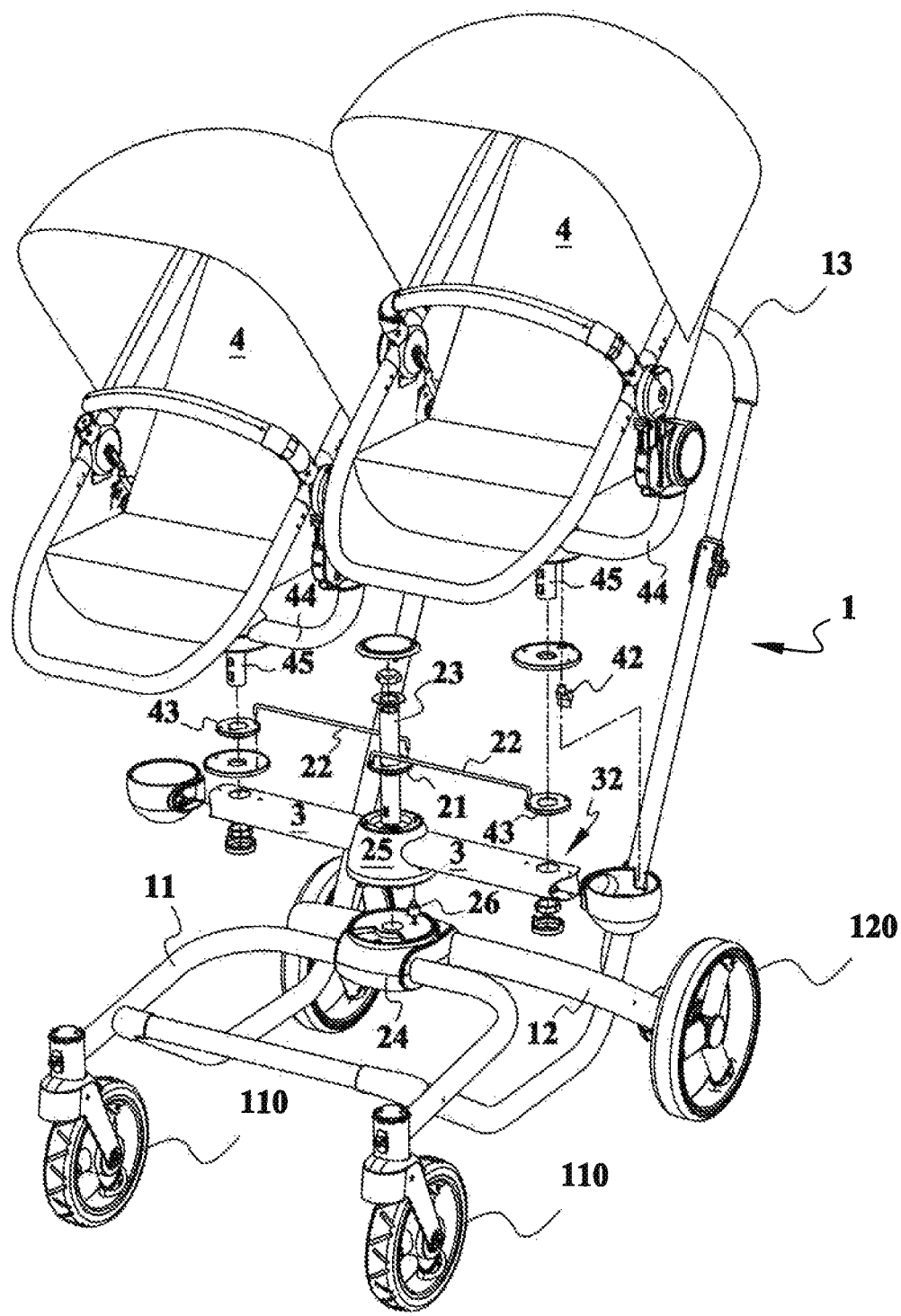
FIG. 3 is an exploded perspective view showing one of the embodiments of the convertible tandem stroller according to the present invention.
Figure 4:
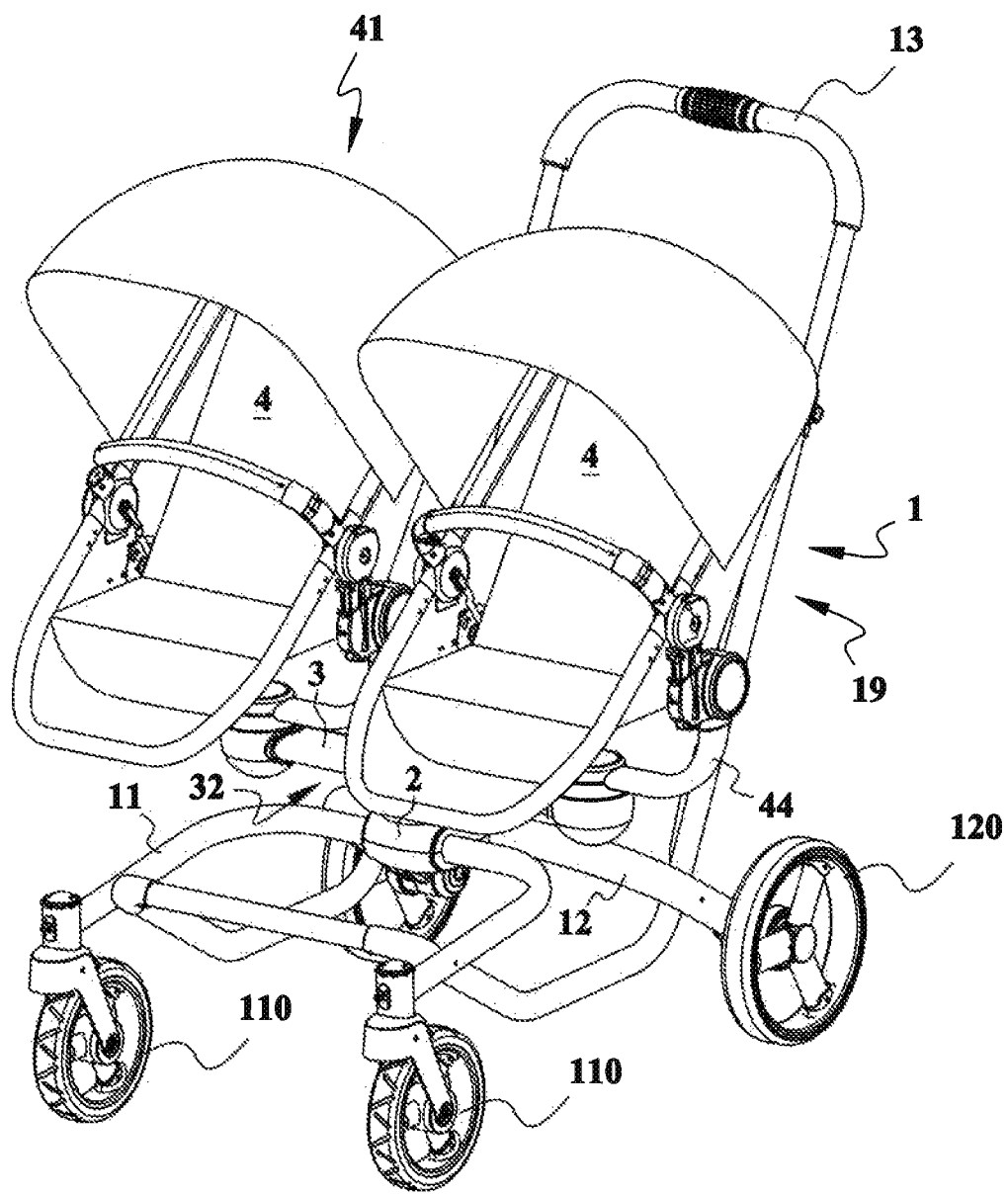
FIG. 4 is a front-left perspective view showing an embodiment of the convertible tandem stroller according to the present invention, in this embodiment both of the chairs are lockable to the extension arms.

As shown in FIG. 3, the swivel mount 2 may include a fixed portion 24 and a swivable portion 25 pivoted on said fixed portion 24 by a shaft 23. The pair of extension arms 3 is firmly connected with the swivable portion 25 of the swivel mount 2 thereby to swivel relative to the fixed portion 24 as well as to swivel relative to the whole wheeled rack 1. By this mechanism, the extension arms 3 are swivable between and selectively positionable on a longitudinally oriented position 31 and a transversely oriented position 32, so as to convert the stroller from a tandem style 18 as shown in FIG. 7 to a side-by-side double seat style 19 as shown in FIGS. 1, 2 and 4, and vice versa.

Preferably, the swivel mount 2 may further to include a spring-biased latch 26 operatively mounted between the fixed portion 24 and the swivable portion 25 for selectively positioning the extension arms 3 on the longitudinally oriented position 31 and the transversely oriented position 32.

The pair of chairs 4 is swivelly mounted on the oppose ends of the pair of extension arms 3. For instance, each of the chairs 4 may be equipped with a vertical shaft 45 for pivoting on the extension arms 3, so as to be capable of turning or swiveling to a forward oriented position 41 when the extension arms 3 are positioned on the longitudinally oriented position 31 as shown in FIG. 7, and capable of turning to the forward oriented position 41 either manually or automatically while the extension arms 3 are positioned on the transversely oriented position 32 as shown in FIGS. 1, 2 and.

Figure 5:
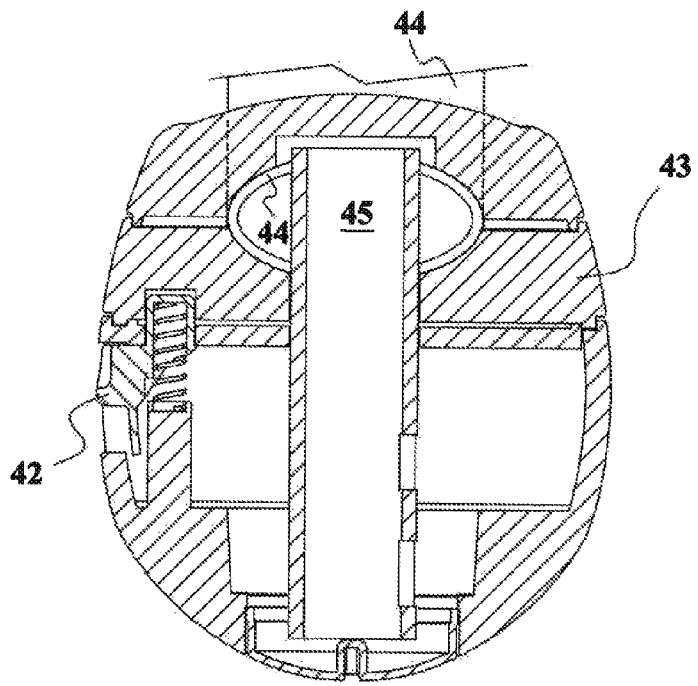
FIG. 5 is a schematic cross-sectional view showing the body frame of the chair of the convertible tandem stroller has been locked to one of the extension arms by a spring-biased latch.
Figure 6:
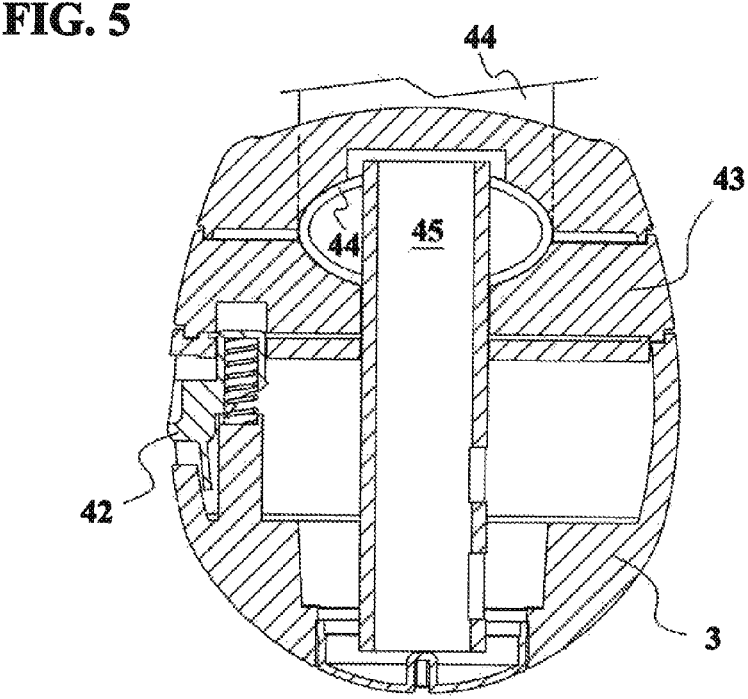
FIG. 6 is a schematic cross-sectional view showing the body frame of the chair of the convertible tandem stroller has been un-locked from one of the extension arms by switching the spring-biased latch.

Referring to FIGS. 3, 5 to 6, the chairs 4 may have a body frame 44 lockable by a spring-biased latch 42 so as to prevent the chairs 4 from freely wobbling while traveling on rough roads.

As best shown in FIGS. 10, 12, 14 and 16, the body frame 44 is rotatable relative to the driven element 43, and the spring-biased latch 42 can be mounted between the body frame 44 and the driven element 43 so as to be capable of releasably locking the body frame 44 to the driven element 43 in a selected position.

Figure 8:
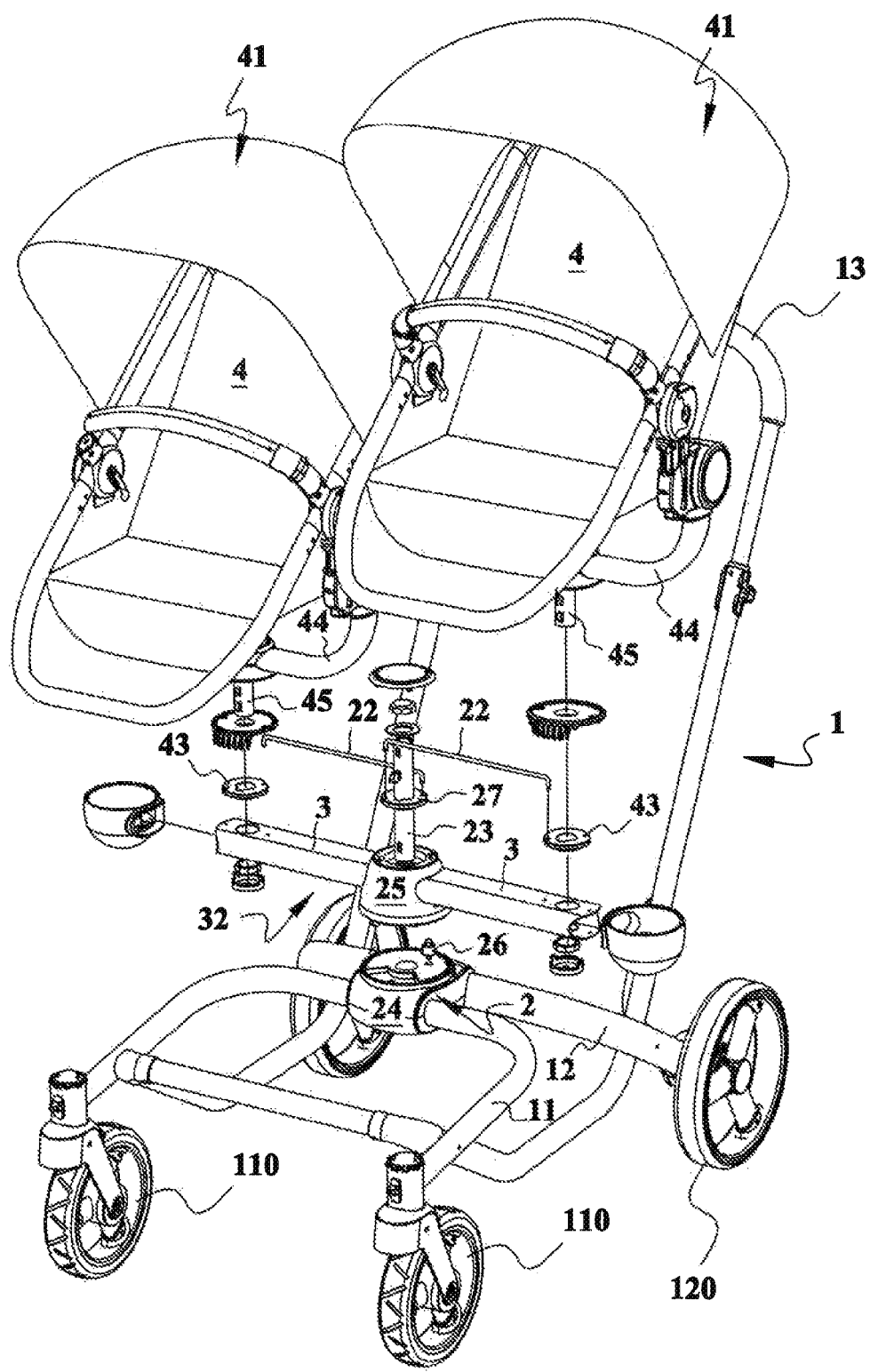
FIG. 8 is an exploded perspective view showing one of the embodiments of the convertible tandem stroller according to the present invention, in this embodiment, the chairs are pivoted on the extension arms without the spring-biased latch; however, the chairs are associated with the extension arms by a transmission relation between the driving element, the driven element and the two linking elements.

As shown in FIG. 8, an alternative embodiment of the mechanism according to the present invention, the swivel mount 2 may also include a fixed portion 24 and a swivable portion 25 pivoted on said fixed portion 24 by a shaft 23. The pair of extension arms 3 is firmly connected with the swivable portion 25 of the swivel mount 2 thereby to swivel relative to the fixed portion 24 as well as to swivel relative to the whole wheeled rack 1. By this mechanism, the extension arms 3 are swivable between and selectively positionable on a longitudinally oriented position 31 and a transversely oriented position 32, so as to convert the stroller from a tandem style 18 as shown in FIG. 7 to a side-by-side double seat style 19 as shown in FIGS. 1, 2 and 4, and vice versa.

In this embodiment, the swivable portion 25 may include a driving element 27, and each of the chairs 4 includes a driven element 43 for associating with the driving element 27 via a linking element 22; when the pair of extension arms 3 is swiveling relative to the wheeled rack 1, the driving element 27 is driving the driven element 43 under the chairs 4 to rotate and change direction of the chairs 4 toward the forward oriented position 41.

Referring to FIGS. 10 to 20, an operation is schematically illustrated: when the pair of extension arms 3 is swiveling from the longitudinally oriented position 31 as shown in FIG. 9 to the transversely oriented position 32 as shown in FIG. 4, the chairs 4 are swiveling for self-keeping in the forward oriented position 41 automatically and simultaneously. Similarly, when the pair of extension arms 3 is swiveling from the transversely oriented position 32 to the longitudinally oriented position 31, the chairs 4 are also capable of swiveling in order to self-keep in the forward oriented position 41.

Figure 21:
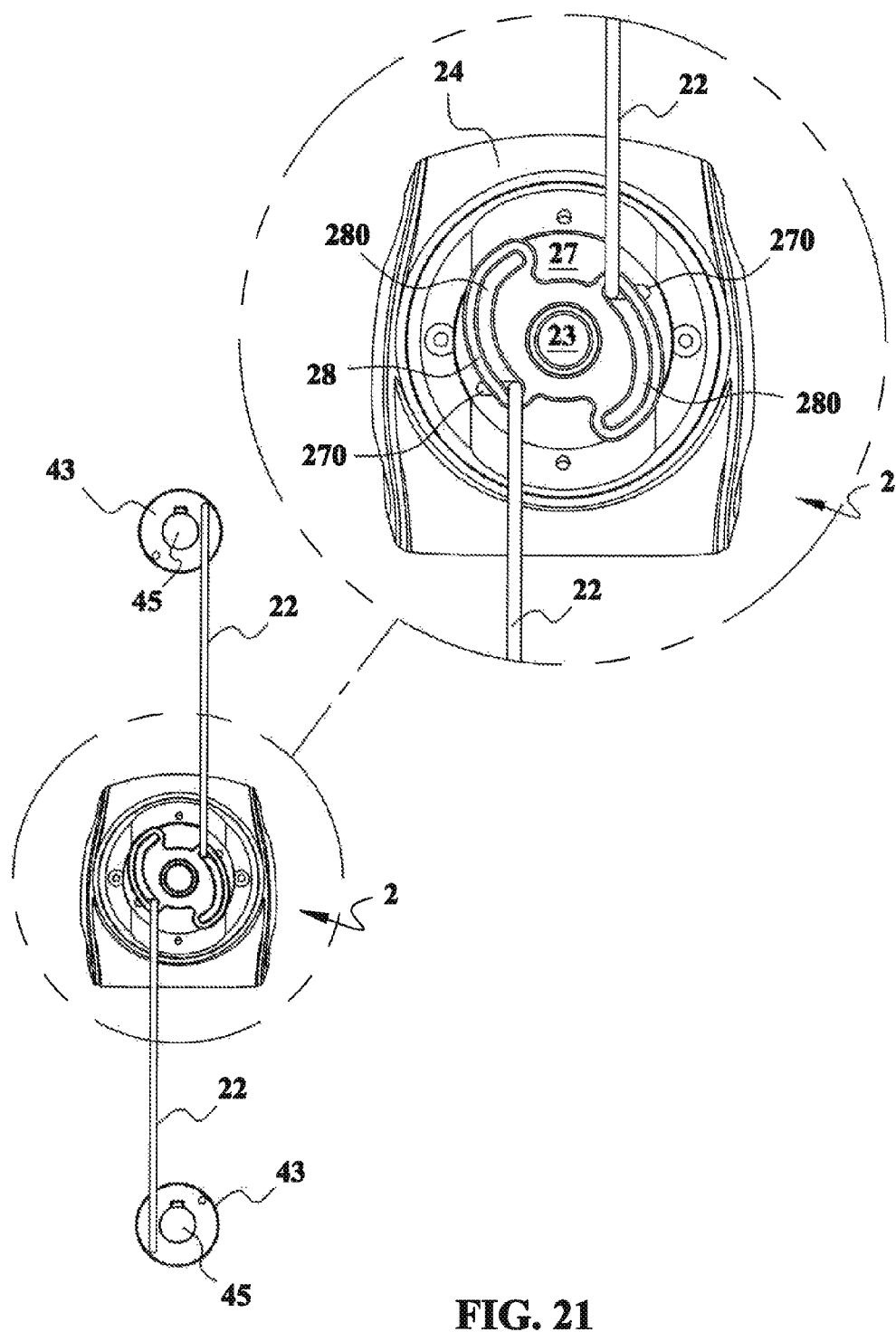
FIG. 21 is a schematic perspective view showing a slightly alternative embodiment of the swivel mount, and an association between the vertical shaft of the chairs, the driven element, the linking elements and the driving element, when the extension arms are positioned on a longitudinally oriented position.
Figure 22:
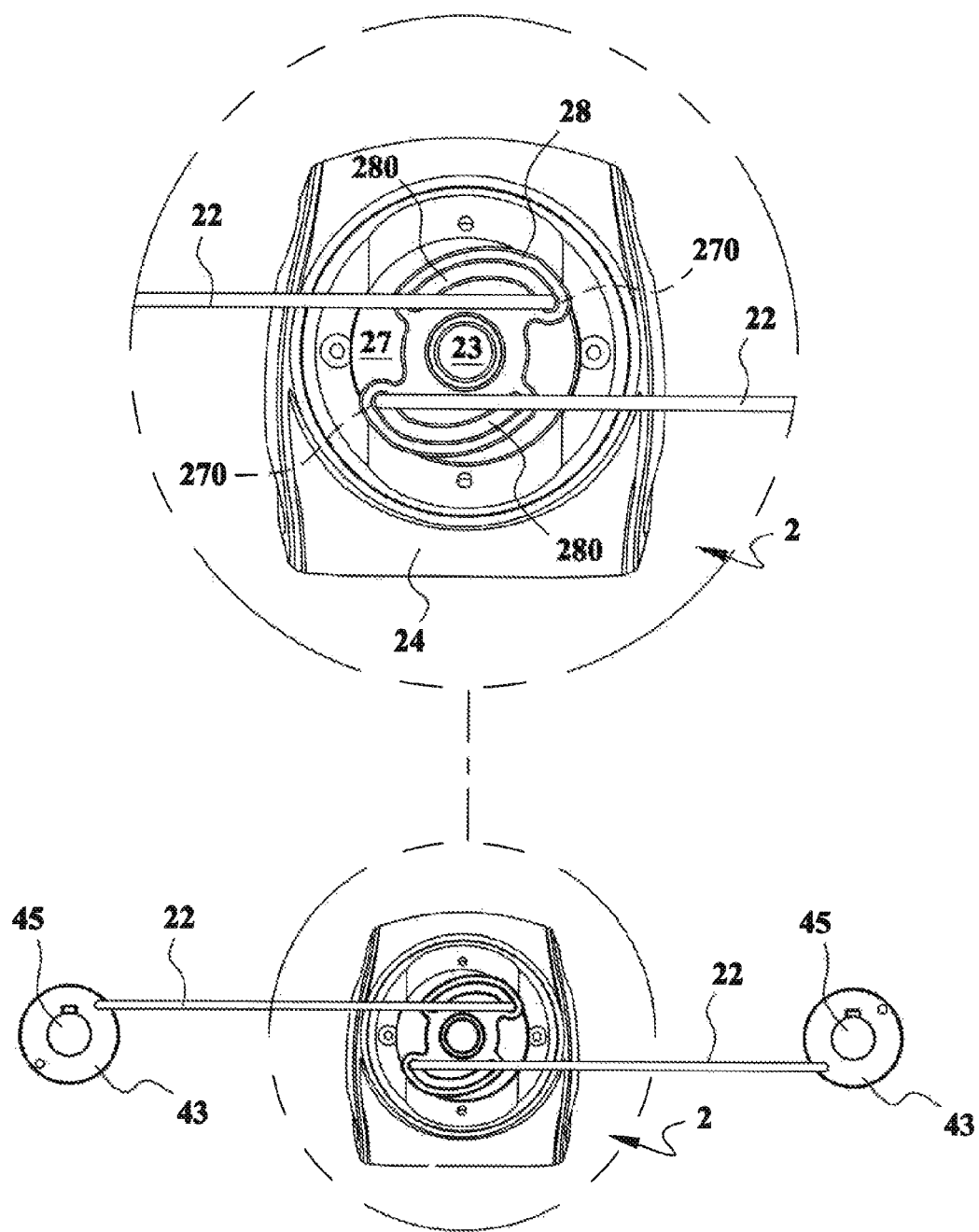
FIG. 22 is a schematic perspective view showing the slightly alternative embodiment of the swivel mount, and the association between the vertical shaft of the chairs, the driven element, the linking elements and the driving element, when the extension arms are positioned on a transversely oriented position.
Figure 23:
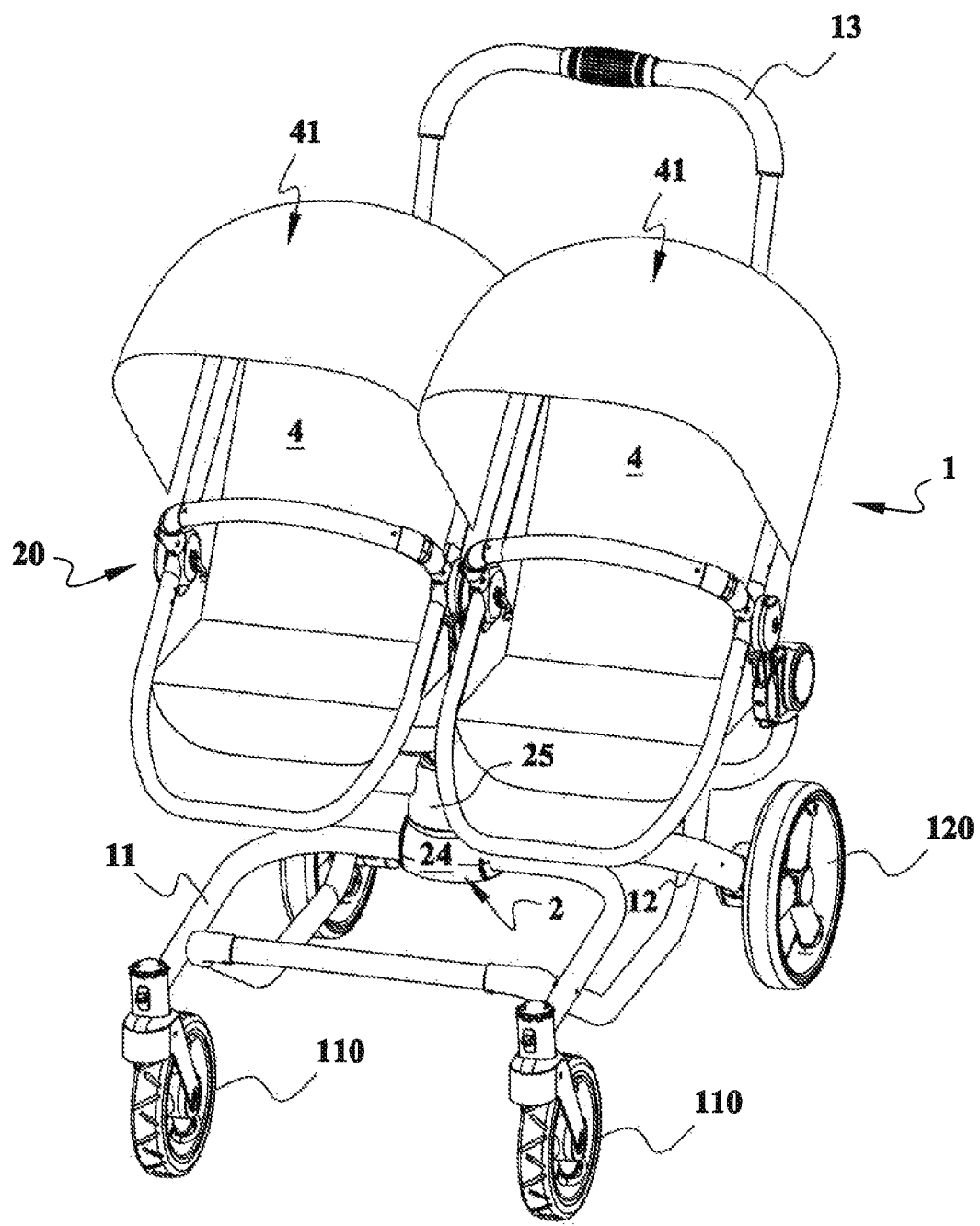
FIG. 23 is a schematic perspective view showing a convertible tandem stroller with said slightly alternative embodiment of the swivel mount, when the extension arms are positioned on its transversely oriented position, the chairs shall have a shortened distance for reducing the width of the stroller when being converted to a side-by-side double seat style.

Referring to FIGS. 21 to 23, another slightly alternative embodiment of the swivel mount 2 according to the present invention is featured with having a fixed portion 27 being symmetrically formed with two guiding slots 270 for guiding the linking elements 22 so as to shorten the distance between the driven elements 43 of the chairs 4 so as to permit the pair of chairs 4 to be moved to close to each other while the pair of extension arms 3 is swiveling from the longitudinally oriented position 31 to the transversely oriented position 32.

Preferably, a driving element 28 of this embodiment may be symmetrically formed with two cam slots 280 for slidably engaging and guiding the linking elements 22 to move along the guiding slots 270 back and forth while the pair of extension arms 3 is swiveling between the longitudinally oriented position 31 and the transversely oriented position 32.

By this embodiment, when the stroller is converted to use as a tandem style 18, the distance between the chairs 4 can be larger than that being converted to use as a side-by-side double seat style 19.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A convertible tandem stroller with a double seat transfer mechanism, comprising:
    a wheeled rack;
    swivel mount, mounted on the wheeled rack including a fixed portion, and a swivable portion pivoted on said fixed portion through a shaft;
    a pair of extension arms, connected with the swivable portion and capable of swiveling relative to the fixed portion and the wheeled rack;
    a driving element connected with the swivable portion; and
    a pair of chairs swivelly mounted on the pair of extension arms, each having a driven element and linking element; the two linking elements associated the driving element and the two driven elements;
    when the pair of extension arms is swiveling relative to the fixed portion, the driving element follows the swivable portion to rotate and drive the two driven elements via the two linking elements, thereby driving the pair of chairs to change direction simultaneously.

2. The convertible tandem stroller with a double seat transfer mechanism of claim 1, wherein each of the chairs has a vertical shaft for pivoting on the extension arms, and always capable of self-keeping in a forward oriented position when the pair of extension arms is swiveling relative to the fixed portion.

3. The convertible tandem stroller with a double seat transfer mechanism of claim 1, wherein each of the chairs includes a body frame and a spring-biased latch, the body frame is rotatable relative to the driven element, and the spring-biased latch is operatively mounted between the body frame and the driven element and capable of releasably locking the body frame to the driven element.

4. The convertible tandem stroller with a double seat transfer mechanism of claim 1, wherein the wheeled rack has a push arm extending rearward and upwardly, and includes at least a front strut and a pair of rear struts both are firmly connected to the swivel mount; and
    wherein the front strut and the rear struts connect at least a front wheel and two rear wheels under the wheeled rack.

5. The convertible tandem stroller with a double seat transfer mechanism of claim 4, wherein the driving element is symmetrically formed with two cam slots for slidably engaging and guiding the linking elements to move along the guiding slots back and forth thereby increasing a distance between the chairs when the pair of extension arms is swiveling from the transversely oriented position to the longitudinally oriented position.

6. The convertible tandem stroller with a double seat transfer mechanism of claim 1, wherein the pair of extension arms is capable of swiveling relative the wheeled rack and positioning on a longitudinally oriented position and a transversely oriented position so as to convert the stroller from a tandem style to a side-by-side double seat style, and vice versa.

7. The convertible tandem stroller with a double seat transfer mechanism of claim 6, wherein each of the chairs has a vertical shaft for pivoting on the extension arms, and always capable of self-keeping in a forward oriented position when the pair of extension arms is swiveling between the longitudinally oriented position and a transversely oriented position.

8. The convertible tandem stroller with a double seat transfer mechanism of claim 7 further includes a spring-biased latch operatively mounted between the fixed portion and the swivable portion for selectively positioning the extension arms on the longitudinally oriented position and the transversely oriented position.

9. The convertible tandem stroller with a double seat transfer mechanism of claim 7, wherein when the pair of extension arms is swiveling from the longitudinally oriented position to the transversely oriented position, the chairs are swiveling to a forward oriented position simultaneously.

10. The convertible tandem stroller with a double seat transfer mechanism of claim 7, wherein when the pair of extension arms is swiveling from the transversely oriented position to the longitudinally oriented position, the chairs are swiveling to a forward oriented position simultaneously.

11. The convertible tandem stroller with a double seat transfer mechanism of claim 6, wherein the fixed portion is symmetrically formed with two guiding slots for guiding the linking elements to a distance between the driven elements for permitting the pair of chairs to close to each other while the pair of extension arms is swiveling to the transversely oriented position and concerting the stroller to the side-by-side double seat style.

12. The convertible tandem stroller with a double seat transfer mechanism of claim 11, wherein the driving element is symmetrically formed with two cam slots for slidably engaging and guiding the linking elements to move along the guiding slots back and forth thereby decreasing a distance between the chairs when the pair of extension arms is swiveling from the longitudinally oriented position to the transversely oriented position.

* * * * *